United States Patent [19]
Hunter

[11] 3,890,927
[45] June 24, 1975

[54] APPARATUS FOR TREATING TIRE CORD FABRIC

[75] Inventor: Edward E. Hunter, Akron, Ohio

[73] Assignee: The Goodyear Tire & Rubber Company, Akron, Ohio

[22] Filed: Apr. 25, 1974

[21] Appl. No.: 463,937

[52] U.S. Cl. ............... 118/419; 118/420; 118/428; 118/429
[51] Int. Cl. ............................................. B05c 3/12
[58] Field of Search ............ 118/69, 419, 420, 423, 118/428, 429

[56] References Cited
UNITED STATES PATENTS

| | | | |
|---|---|---|---|
| 2,877,140 | 3/1959 | Olstad.................................. | 118/69 |
| 2,912,347 | 11/1959 | Yezek et al........................... | 118/69 |
| 3,043,715 | 7/1962 | Clough.................................. | 118/69 |
| 3,067,056 | 12/1962 | Remer .................................. | 118/69 |
| 3,113,886 | 12/1963 | Kolb .................................... | 118/419 |
| 3,227,577 | 1/1966 | Baessler et al....................... | 118/69 |
| 3,580,218 | 5/1971 | Grundschober et al. ........... | 118/419 |

Primary Examiner—W. C. Reynolds
Assistant Examiner—Douglas Salser
Attorney, Agent, or Firm—F. W. Brunner; H. E. Hummer

[57] ABSTRACT

An apparatus used in the application of a liquid coating, containing a vaporizable solvent, to polyester warp cords of tire cord fabric. The apparatus has a dip tank and applicator drum which are temperature conditioned; that is, they are cooled by a circulating fluid to cool the liquid coating in the dip tank and prevent undue evaporation of the solvent.

4 Claims, 2 Drawing Figures

PATENTED JUN 24 1975

3,890,927

APPARATUS FOR TREATING TIRE CORD FABRIC

BACKGROUND OF THE INVENTION

The invention is particularly well suited for use in the treatment of tire cord fabric formed of warp cords composed of polyester. It is advantageous to impregnate the polyester tire cords with a substance for promoting the bond between the warp cords and rubber material used in the production of tires. Such a substance is effectively applied to the tire cord fabric as a liquid coating containing a solvent which is chemically compatible with the substance.

The tire cord fabric is normally treated by first dipping the fabric in a dip tank containing the liquid coating, including a vaporizable solvent. The fabric is reeved on a rotatable drum which directs the fabric into the liquid coating in the dip tank. The fabric is then removed from the dip tank and dried by heating the wet, coated fabric. During the heating process, the solvent is removed from the fabric as vapor which is reclaimed for reuse in the process.

It has been found that condensate of the solvent builds upon on the various components of the apparatus used in the dipping operation, thereby necessitating stopping the process until the covered parts can be cleaned or replaced. Moreover, the rate at which the solvent evaporates increases rapidly at higher temperatures; therefore, it is advantageous keeping the temperature of the solvent as low as possible without affecting the process of applying the substance to the tire cords. The invention is directed to solving these problems by (1) reducing the temperature of the dip tank and applicator drum to a point where the parts help maintain the solvent at lower temperatures to prevent undue evaporation of the solvent, and (2) providing a lubricant on the surfaces of the parts contacting the liquid coating, such that condensate of the solvent will not readily adhere to the parts.

Briefly stated, the invention is in an apparatus for treating tire cord fabric with a liquid coating containing a vaporizable solvent. A dip tank is provided for holding the liquid coating. The tire cord fabric is reeved on an applicator drum which is mounted for rotation in the dip tank and used to direct the fabric into contact with the liquid coating. Means are supplied for circulating a cooling fluid into contact with the dip tank and drum to reduce their temperatures sufficiently to chill and cause sweating of the tank and drum surfaces exposed to the liquid coating.

Another aspect of the invention is deliberately chilling a guide roller disposed outside and downstream from the dip tank and used for guiding the tire cord fabric from the dip tank into another chamber for further processing, such as the heating and drying of the fabric. The chilled roller also sweats which acts as a lubricant for helping keep condensate of the solvent from building up on the rollers.

DESCRIPTION OF THE DRAWING

The following description of the invention will be better understood by having reference to the annexed drawing, wherein.

DESCRIPTION OF THE INVENTION

Figures 1, 2:
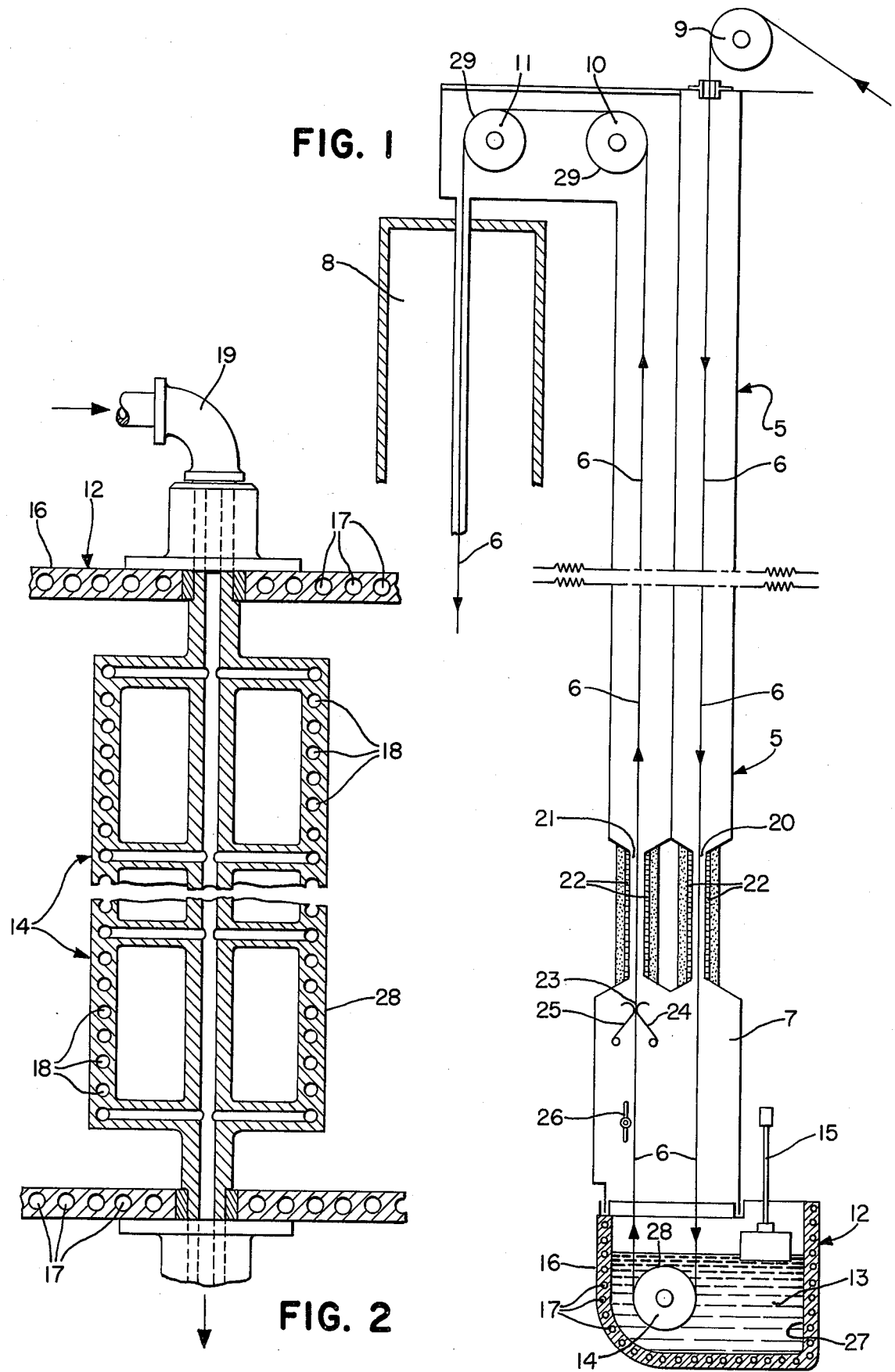
FIG. 1 is a cross-section of an apparatus which is made in accordance with the invention and used for treating tire cord fabric.
FIG. 2 is an enlarged section of an applicator drum used in directing the tire cord fabric into a liquid coating contained in a dip tank.

Referring to FIG. 1 of the drawing, there is shown an apparatus 5 used for treating tire cord fabric 6. The apparatus 5 essentially comprises a dip chamber 7, an adjacent heat treating chamber 8, and a plurality of rollers 9–11 for guiding the tire cord fabric 6 successively through the dip chamber 7 and heat treating chamber 8.

The dip chamber 7 comprises a dip tank 12 for holding a liquid coating 13 containing a solvent which evaporates very rapidly at high temperatures, e.g., about 90°F. An applicator drum or dip roller 14 is rotatably mounted in the dip tank 12 and used for directing the tire cord fabric 6 into the liquid coating 13. A float 15 is used as a gauge for indicating the level of the liquid coating 13 within the dip tank 12. The walls 16 of the dip tank 12 are provided with passageways 17 for receiving a cooling fluid, e.g. water.

The applicator drum 14 (FIG. 2) is also provided with a series of passageways 18 for receiving a cooling fluid, e.g. water. A pipe or hose 19 through which water is pumped into the applicator drum 14, is coupled to the drum 14 by a standard fitting which permits rotation of the drum 14 relative to the hose 19. Any suitable means, such as a pump, can be used to circulate water from a storage tank through the passageways 17 and 18 of the dip tank 12 and applicator drum 14.

An entrance opening 20 is disposed in the dip chamber 7 in spaced relation from an exit opening 21. The tire cord fabric 6 passes into and out of the dip chamber 7 through these openings 20, 21 which are vertically spaced above the dip tank 12. A seal 22 is provided in each of the openings 20, 21 for preventing the passage of solvent vapor from the dip chamber 7. A good seal 22 and opening combination is described in a copending application Ser. No. 464,016, filed Apr. 25, 1974, and entitled, "A Seal for an Opening in a Chamber Containing Vapor".

A scraper blade assembly 23, including a pair of wiper blades 24 and 25 for compressibly engaging the tire cord fabric 6, is disposed in the dip chamber 7 between the applicator drum 14 and exit opening 21, for removing excess liquid coating 13 from the tire cord fabric 6, shortly after the fabric 6 leaves the dip tank 12. A rotatable beater bar 26 is provided between the dip tank 12 and scraper blade assembly 23, for contacting and shaking the fabric 6 to help remove excess liquid coating 13 from the fabric 6.

The tire cord fabric 6, after dipping, is removed from the dip chamber 7 and guided over a pair of head rollers 10 and 11 into the adjacent chamber 8, where the undried, coated fabric 6 is heated to remove the solvent, as vapor, and dry the fabric for further processing and use in a tire.

The two head or guide rollers 10 and 11, like the applicator drum 14, are constructed with a series of passageways for receiving a cooling fluid, such as water. The water, used as a cooling fluid for the dip tank 12, applicator drum 14, and guide rollers 10, 11 is preferably at a temperature in the broad range of from 35° to 50°F. and in the more selective range of from 40° to 45°F., such that the tank 12, drum 14, and rollers 10, 11 are maintained at temperatures which preferably do not exceed 50°F. It has been found that the solvent evaporates much more rapidly at temperatures higher than 50°F., e.g., at about 90° – 100°F. the solvent flashes off as a vapor. The cooled parts, especially the applicator drum 14, also have a cooling effect on the freshly coated fabric 6 which is beneficial in maintaining a low rate of evaporation of the solvent in the liquid coating 13. The tank 12, drum 14, and rollers 10, 11 are chilled and caused to sweat which forms on the tank, drum, and roller surfaces 27, 28, and 29, contacting the fabric 6 or liquid coating 13. The sweat acts as a lubricant for eliminating or substantially reducing the adherence of condensate of the solvent to the surfaces of the tank, drum, and rollers, contacting the fabric or liquid coating.

Thus, there has been described a highly improved apparatus for applying a liquid coating, including a vaporizable solvent, to tire cord fabric. A very simple, but practical device is used to cool essential components of the apparatus to reduce evaporation of the solvent and provide a lubricant for eliminating or substantially reducing the buildup of solvent condensate on the components. This helps maintain the apparatus in continuous operation and avoids the shutdowns normally required for cleaning solvent condensate adhering to surfaces, of the apparatus, contacting the liquid coating, or the liquid coated fabric.

What is claimed is:

1. An apparatus for treating tire cord fabric, comprising:
   a. a dip tank containing a liquid coating comprising a mixture of a substance for promoting the bond between the warp cords of the tire cord fabric and rubber material in which the fabric is later embedded, and a vaporizable solvent which is chemically compatible with the substance, the dip tank including a series of fluid passageways which are adjacent surfaces of the dip tank coming in contact with the liquid coating and sealed from liquid coating in the dip tank;
   b. means for sealing the dip tank from the ambient atmosphere;
   c. an applicator drum, rotatable in the dip tank, for directing tire cord fabric into the liquid coating, the drum including a series of fluid passageways which are sealed from the liquid coating and disposed adjacent the outer cylindrical surface of the drum;
   d. means for cooling the applicator drum to a temperature sufficient to reduce the rate of evaporation of the solvent occurring when the drum is not cooled, said means including means for circulating cooling fluid through the fluid passageways of the drum; and
   e. means for cooling the dip tank to help reduce the rate of evaporation of the solvent, said means including means for circulating cooling fluid through the fluid passageways of the dip tank, the cooling fluid circulated through the drum and dip tank being a liquid at a temperature in the range of from 35° to 50°F.

2. The apparatus of claim 1, wherein the liquid is at a temperature in the range of from 40° to 45°F.

3. The apparatus of claim 2, which includes at least one guide roller disposed downstream from the dip tank for guiding the fabric from the dip tank, and means for circulating a cooling fluid through the guide roller, the temperature of the fluid being sufficient to chill surfaces of the guide roller contacting the fabric and cause sweating on said surfaces.

4. The apparatus of claim 3, wherein the fluid is a liquid at a temperature in the range of from 35° to 50°F.

* * * * *